No. 736,975. PATENTED AUG. 25, 1903.
W. W. KEENER.
AUTOMATIC ELECTRIC SAFETY SIGNAL.
APPLICATION FILED MAR. 13, 1903.
NO MODEL. 3 SHEETS—SHEET 1.
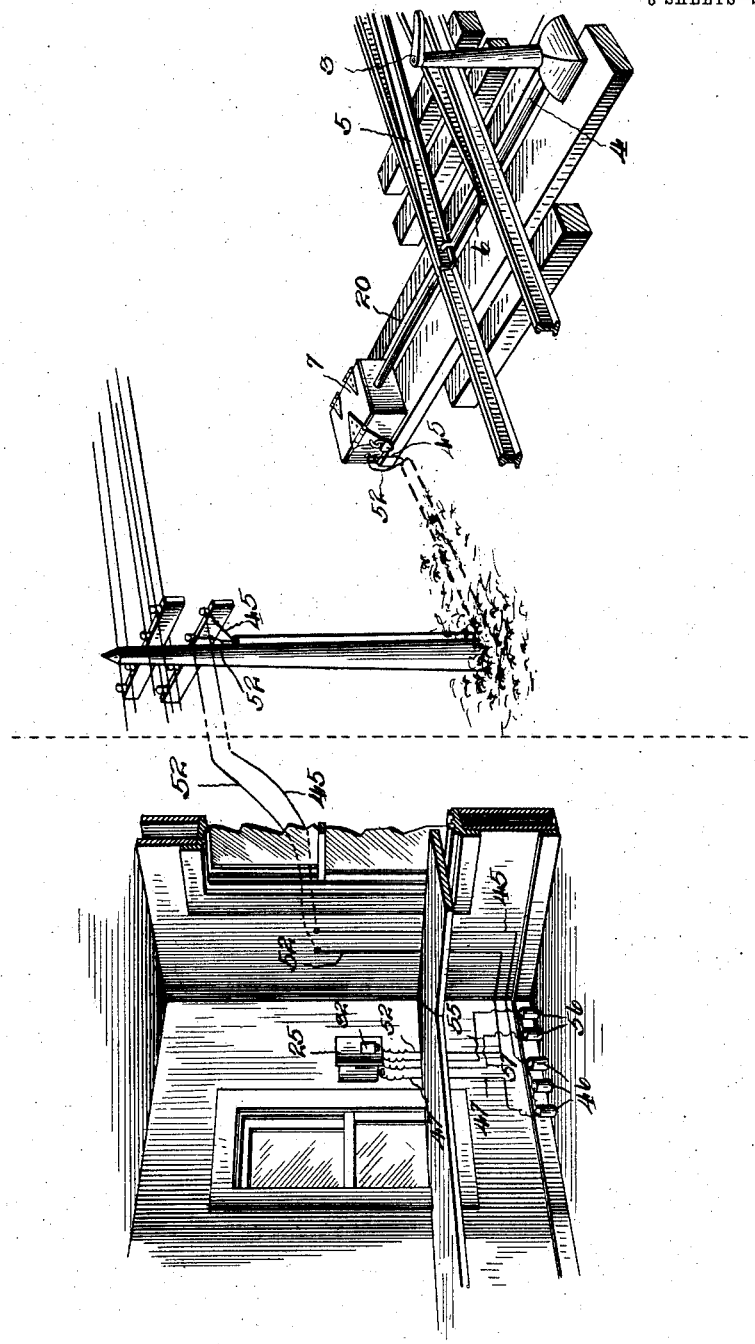
Witnesses
R. A. Boswell
C. S. Frye
Inventor
W. W. Keener.
By W. J. Fitzgerald & Co.,
Attorneys No. 736,975. PATENTED AUG. 25, 1903.
W. W. KEENER.
AUTOMATIC ELECTRIC SAFETY SIGNAL.
APPLICATION FILED MAR. 13, 1903.
NO MODEL. 3 SHEETS—SHEET 2.
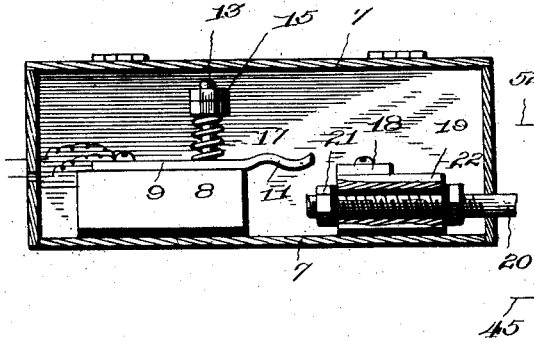
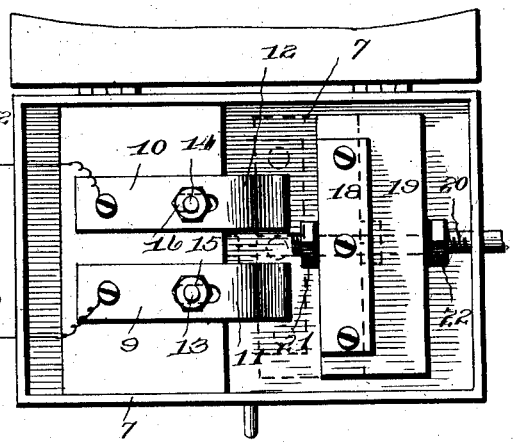
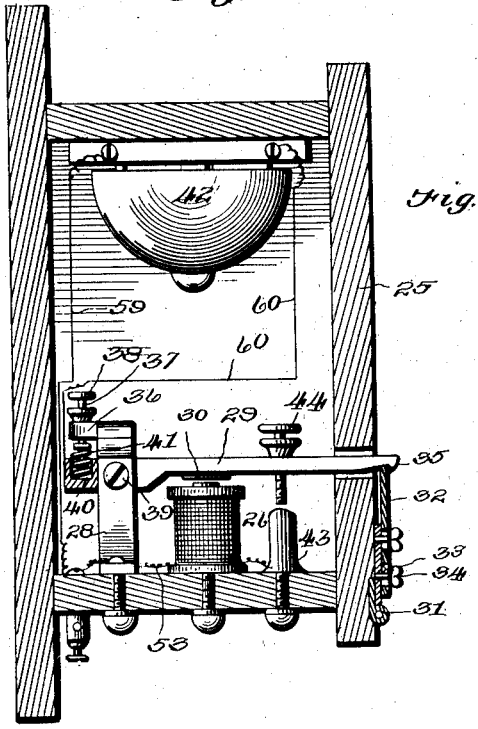
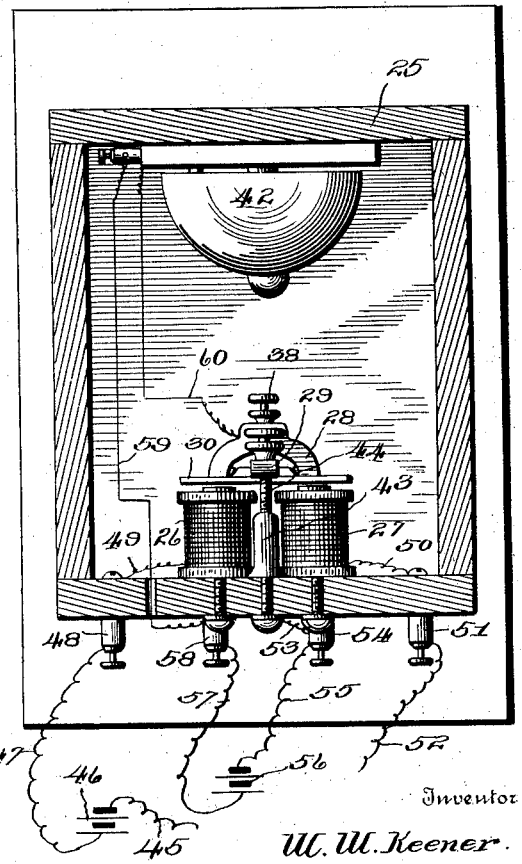
Witnesses
R. A. Boswell.
C. S. Frye.
Inventor
W. W. Keener.
By W. T. Fitzgerald Co.
Attorneys No. 736,975. PATENTED AUG. 25, 1903.
W. W. KEENER.
AUTOMATIC ELECTRIC SAFETY SIGNAL.
APPLICATION FILED MAR. 13, 1903.
NO MODEL. 3 SHEETS—SHEET 3.
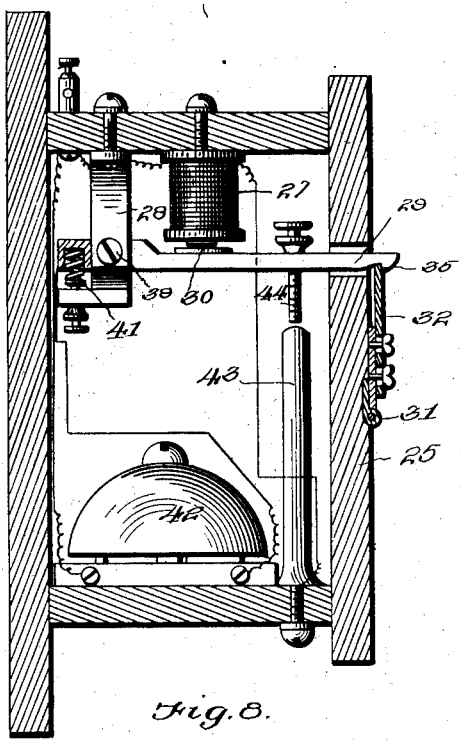
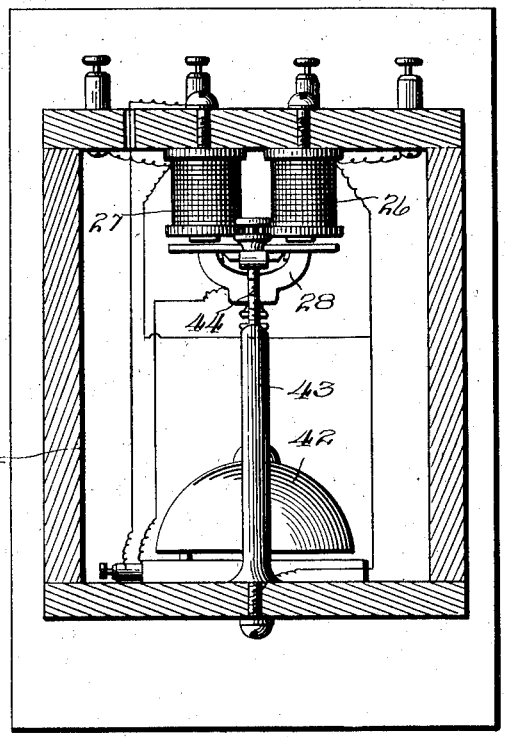
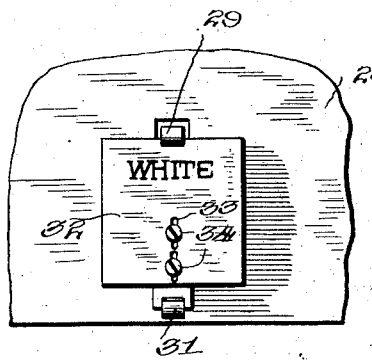
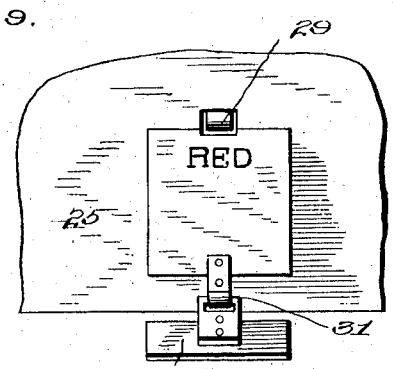
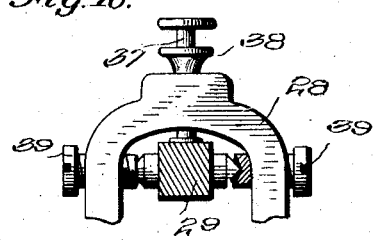

No. 736,975. Patented August 25, 1903.

UNITED STATES PATENT OFFICE.

WILLIAM W. KEENER, OF CHESTERFIELD, INDIANA.

AUTOMATIC ELECTRIC SAFETY-SIGNAL.

SPECIFICATION forming part of Letters Patent No. 736,975, dated August 25, 1903.

Application filed March 13, 1903. Serial No. 147,653. (No model.)

*To all whom it may concern:*

Be it known that I, WILLIAM W. KEENER, a citizen of the United States, residing at Chesterfield, in the county of Madison and State of Indiana, have invented certain new and useful Improvements in Automatic Electric Safety-Signals; and I do hereby declare the following to be a full, clear, and exact description of the invention, such as will enable others skilled in the art to which it appertains to make and use the same.

My invention relates to interlocking electric safety-signals; and it consists of certain novel features of construction and combination of parts, the preferred form whereof will be hereinafter clearly set forth, and pointed out in the claims.

The prime object of my invention is to provide an electric circuit preferably normally energized and having signal-holding devices and a circuit-closing device, the latter to be automatically controlled by throwing the switch of the railroad-track open, whereby the continuity of the main track will be broken.

A further object of my invention is to provide a signal or indicator which will be automatically actuated or displayed to the view of the attendant in the switch-tower or other point where the apparatus may be located.

Other objects and advantages will be hereinafter made clearly apparent, reference being had to the accompanying drawings, which are made a part of this application, and in which—

Figure 1 is a diagrammatical perspective view of my device as applied to use. Fig. 2 is a sectional view through the circuit-breaker box. Fig. 3 is a top plan view thereof with the lid of the box thrown open. Fig. 4 is a sectional view of the indicator-box. Fig. 5 is a transverse sectional view thereof. Figs. 6 and 7 are similar views of a modified form of indicator. Figs. 8 and 9 are detail plan views of a portion of the indicator mechanism, and Fig. 10 is a detail plan view of a portion of the magnet mechanism.

Briefly stated, my invention provides an independent electric circuit extending from the tower to one or more of a plurality of switches, located contiguous to or remote from the signal-tower, whereby the condition of the switches and the main track may be readily ascertained at a single glance or by the ringing of a bell or the actuation of other notice-attracting device.

Referring to the drawings, in which similar reference characters designate corresponding parts throughout, 1 indicates the usual signal-tower or telegraph-station, and 2 the usual form of railroad-switch, the said switch being opened and closed by means of a crank-shaft 3 and pitman 4, the free ends of the rails 5 and 6 being secured to the pitman 4 in the usual manner.

Mounted upon a suitable platform at one side of the switch proper is a circuit-breaker box 7, the said box having secured therein an insulated block 8, said block carrying on its upper surface suitable contact-fingers 9 and 10. The said fingers have one of their ends secured to the block 8 by means of binding-screws or the like, their opposite ends extending beyond the edges of said block and terminating in the curved portions 11 and 12. Intermediate the curved ends 11 and 12 and the binding-screws the said fingers are provided with openings through which pass bolts 13 and 14, the lower ends of which take into the block 8, the upper ends thereof being threaded and provided with suitable nuts 15 and 16. Surrounding the bolts 13 and 14 intermediate the fingers and the nuts are tension-springs 17, by which construction the fingers 9 and 10 are given different degrees of tension. The curved portions 11 and 12 of the fingers 9 and 10 are adapted to engage a metal plate 18, carried by a suitable insulated block 19, the said block being secured upon one end of a shaft 20, said shaft passing through an orifice in the end of the box 7 and having its free end secured to the pitman 4 in any preferred manner. It will be seen that by this construction when the switch is moved in one direction the block 19 will be drawn from under the fingers 9 and 10 and the circuit broken, and when moved in the opposite direction the block 19 will be forced under the curved ends 11 and 12 of the fingers 9 and 10, thus closing the circuit. The shaft 20 is threaded at one end and provided with suitable nuts 21 and 22, so that the block 19 may be nicely adjusted to insure complete contact between the plate 18 and arms 9 and 10.

Located at any convenient point within the tower 1 is a box 25, said box being arranged to contain suitable signaling mechanism comprising the usual form of magnets 26 and 27, secured to the floor of the box 25 by screws or other preferred means. Also secured to the bottom of the box and immediately behind the magnets is a metal arch 28, said arch being designed to carry suitable pivot-points for the locking-bar 29. The bar 29 is provided with an armature-plate 30, disposed immediately above the magnets 26 and 27, and is adapted to coöperate therewith.

Secured to the outer face of the box 25, as by a hinge 31, is a plate 32, said plate being provided with elongated slots 33, through which take screws 34, by which means the plate is adjustably secured to the hinge 31. The upper edge of the plate 32 is designed to come in contact with the bar 29, the outer end of said bar being provided with a suitable notch 35 to receive the upper edge of the plate and hold said plate in an upright position. The space on the face of the box 25, covered by the plate 32 when in its upright position, as best shown in Fig. 9 of the drawings, is painted red.

Formed integral with the arch 28 and on the rear upper edge thereof is a lug 36, through which takes a tension-screw 37, the said screw being provided with the usual adjusting-nuts 38. The locking-bar 29 extends beyond its pivot-point 39 and is provided with a recess 40 on its upper face, into which takes one end of a spring 41, the opposite end of said spring contacting the screw 37, by which means the tension of said spring is regulated.

Secured to the upper portion of the box 25 in any preferred manner is a bell 42, which is equipped with the usual and well-known form of magnets adapted to be operated by an electric current and ring the bell.

Secured to the floor of the box 25 is a post 43 in such position as to register with an adjusting-screw 44, carried by the locking-bar 29, the object of which will be hereinafter more clearly stated.

In operation we will assume that the switch is set for the main track and that a train desires to take the side track. The switch is thrown in the opposite direction through the medium of the crank-shaft 3 and pitman 4. Owing to the fact that the shaft 20, carrying the block 19, is secured to the pitman 4, the said block is drawn away from the fingers 9 and 10, thus disconnecting said fingers and the plate 18 and breaking the circuit. When the circuit is broken, the action of the magnets upon the armature-plate ceases, thus permitting the spring 41 to act upon the inner end of the locking-bar 29, whereby the outer end containing the notch 35 will be elevated and allow the plate 32 to drop down and expose the red signal. As long as the plate 32, which, it might be stated, is preferably painted white, is down and the bell does not ring, the operator will understand that the switch is open and that there is danger. As soon as the train has pulled in on the siding the switch is again closed and the block 19 driven under the fingers 9 and 10 and the circuit again closed. This operation causes the magnets to again act upon the armature-plate, and as the current of electricity is stronger than the tension of the spring 41 the locking-bar 29 is drawn down until the screw 44 comes in contact with the post 43, thus closing the bell-circuit and causing the bell to ring. By this means the operator knows that the switch is closed. In order to stop the bell from ringing, the operator raises the plate 32 and forces it under the end of the bar 29, where it is held by coming in contact with the notch 35, as best shown in Fig. 4 of the drawings. When the bar 29 is thus raised, the bell-circuit is broken, as the screw 44 is slightly removed from the post 43. The plate 32 also covers the red signal and displays the white signal, so that by a casual glance the operator can tell when the switch is closed or open.

In tracing the circuit from the box 7 to the box 25 and return I will take the finger 9 in the box 7 as a starting-point. The current passes through a line-wire 45 to a series of batteries 46 in the tower 1, thence through a wire 47 to the binding-post 48, thence through a wire 49 to the magnet 26 through the magnet 27, thence through the wire 50 to the binding-post 51 through the line-wire 52 back to the box 7, where the current passes into the fingers 10 and through the plate 18 to the finger 9, thus completing the entire circuit. In tracing the bell-circuit I desire to start with the post 43, thence through the wire 53 to the binding-post 54, thence through a wire 55 to a series of batteries 56, thence through a wire 57 to the binding-post 58, thence through a wire 59 to the bell, thence through a wire 60 to the rear end of the locking-bar 29, thence through the bar 29 to the screw 44 and to the post 43. The wire 60 is adapted to be soldered or otherwise secured to the bar 29 and is of such a length as not to interfere with the operation of said bar. It will now be seen that it would be impossible to replace the plate 32 and display the white signal when the switch is open from the fact that the spring 41 is holding the locking-bar 29 up so that the notch 35 will not engage the upper edge of said plate, thus permitting it to fall down again and display the red or danger signal.

Should one of the line-wires break, the device would operate in the same way as when the switch is opened, releasing the plate 32 and showing the red or danger signal, and the operator when seeing said signal would immediately investigate, and finding no train there he would know that something was wrong with the signaling apparatus. If the wires after breaking become grounded, and thus complete the circuit, the bell would ring, as the plate 32 would be released immediately upon the breaking of the wire and drop down before the ends of the wire have a chance to become grounded. Should the line-wires get crossed between the circuit-breaker and the box 25, the signal would fail to work, and should the wires become crossed between the battery and the box 25 the plate 32 would be released and the danger-signal exposed.

If it is desired, the device may be periodically tested by the operator manually releasing the plate 32, when if the bell rings he will know that that part of the device is in working order, and if the locking-bar 29 engages and retains the plate 32 when replaced the operator knows that the entire device is in perfect order.

The above-described device is to be employed in connection with a closed circuit employing a galvanic battery.

In Figs. 6 and 7 I have shown a modified form of indicator and one to be used in connection with an open circuit employing a sal-ammoniac or caustic battery, the essential difference being that the bell is placed in the bottom of the box 25 and that the magnets and accessory parts are placed in the upper portion of the box. By this construction it will be seen that when the switch is closed the circuit will be broken, it being understood that the circuit-breaker is on the opposite side of the switch from that shown in Fig. 1. When the switch is opened, the circuit is closed, the attraction of the magnets upon the armature serving to raise the outer end of the locking-bar 29 and release the plate 32. As the instrument here shown is inverted from that shown in the other views, it is necessary to place the notch 35 upon the other side of the bar 29, and as the post 43 still retains its position it is also necessary to insert the screw 44 from the other side of said bar. When the switch is again closed, the circuit will be broken and the bar 29 thrown downwardly by the action of the spring 41 upon the inner end of said bar 29 until the adjusting-screw 44 comes in contact with the post 43, when the bell-circuit will have been completed and the bell continue to ring until the plate 32 is again placed under the bar 29 and the bell-circuit broken. By this construction it will be seen that the action of the device upon the plate 32 will be opposite to that previously described in that the magnets in this case release the plate 32 and the spring 41 holds said plate in its upright position and also closes the bell-circuit.

It will be obvious that the field of operation or usefulness of my safety signal or indicator may be extended to reach beyond the point of vision of the tower attendant, enabling him to determine the position of a switch or switches remotely situated or beyond a turn in the track or in an otherwise obscured location. I have illustrated and described how the circuit may be normally energized or normally deënergized, according to the nature of the battery which it may be preferred shall be used, and I have also pointed out a simple procedure for ascertaining whether the circuit remains alive or has become inactive and dead through short-circuiting or other causes, leaving it to the person making the insulation of the system the choice of construction and arrangement which he may consider most fully meeting the requirements of the case in hand.

Inasmuch as various modifications and changes may be made in materializing my system and applying it to actual use, I wish to comprehend in this application such substantial equivalents and substitutes for the devices described as may be considered as falling fairly within the scope of my invention.

Believing that the advantages and manner of using my improved indicator have thus been made clearly apparent, further description is deemed unnecessary.

What I claim as new, and desire to secure by Letters Patent, is—

1. In a signaling device or indicator of the character specified, the combination of an electric circuit having its poles or terminals located contiguous to the switch to be operated, circuit closing and breaking devices operatively connected with the switch, an electric battery located in the switch-tower or other desired point, wires leading from said battery to said circuit closing and breaking device, a danger and safety signal, means to adjust said safety-signal, a locking-bar adapted to normally hold the safety-signal over the danger-signal, magnets adapted to hold said locking-bar in engagement with said safety-signal when energized, a spring adapted to raise said bar when the magnets are deënergized and release the safety-signal, means to regulate the tension of said spring, an auxiliary electric circuit having a bell, and means to close and break said auxiliary circuit, as set forth.

2. In a signaling device, the combination with an electrically controlled and operated signal, of a circuit breaker and closer comprising the stationary block 8, contact-fingers 9 and 10 attached thereto, said fingers terminating at one end in the S-shaped curved portions 11 and 12, line-wires connecting said fingers and signaling device, posts 13 and 14 secured in the block 8 and extending upward through slots in said fingers, springs surrounding said posts, means to adjust the tension of said springs, a movable block 19, a contact-plate secured to said block and adapted to coöperate with said fingers and means connecting said block with the switch proper, whereby when the switch is moved in one direction the circuit will be broken and in the opposite direction the circuit will be closed, substantially as set forth.

In testimony whereof I affix my signature in presence of two witnesses.

WILLIAM W. KEENER.

Witnesses:
 IRA M. HEATH,
 R. J. TRIMBLE.